United States Patent Office 3,336,336
Patented Aug. 15, 1967

3,336,336
PROCESS FOR THE MANUFACTURE OF A-NOR-B-HOMO-STEROIDS AND INTERMEDIATES OBTAINED THEREFROM
Oskar Jeger, Zollikerberg, Zurich, and Kurt Schaffner, Zurich, Switzerland, assignors to Ciba Corporation, New York, N.Y., a corporation of Delaware
No Drawing. Filed Oct. 19, 1964, Ser. No. 404,922
Claims priority, application Switzerland, Nov. 1, 1963, 13,435/63
20 Claims. (Cl. 260—239.55)

The present invention provides a new process for the manufacture of 3:6-dioxo-A-nor-B-homosteroids.

According to the known process for the manufacture of these compounds 3-oxo-4:5-oxidosteroids are irradiated with ultraviolet light.

The present invention is based on the observation that the afore-mentioned 3:6-dioxo-A-nor-B-homosteroids are also obtained when 4-sulfonyloxy - 5 - hydroxysteroid-3-ketals, in which the 4:5-substituents are in cis-position relatively to each other and which are unsubstituted in position 11 or substituted by a free or functionally modified hydroxyl group, are treated with a substance that eliminates sulfonic acid. This process can be represented, for example, by the following scheme of simplified partial formulae:

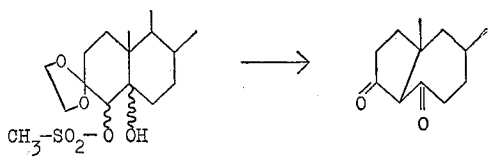

These final products can also be represented by the following formulae of their enol compounds:

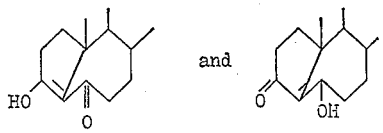

Surprisingly, the reaction with those corresponding starting materials which contain a 3-oxo group does not take the indicated course.

The starting materials to be used in the new process belong preferably to the androstane, pregnane, cholane, cholestane, spirostane or cardanolide series or to the corresponding 19-nor series. They may contain one or more than one additional substituents in the ring system and in the side chain, for example free or functionally modified hydroxyl or keto groups, for example acyloxy groups of carboxylic acids with up to 20 carbon atoms, such as acetoxy, propionyloxy or benzoyloxy groups; lower alkoxy such as methoxy or ethoxy groups; the tetrahydropyranyloxy group or lower alkylenedioxy such as the ethylenedioxy, 1:2- or 1:3-propylenedioxy groups; also lower aliphatic hydrocarbon radicals, e.g. lower alkyl, alkylene, alkenyl or alkinyl groups, such as methyl, ethyl, propyl, methylene, vinyl, allyl, ethinyl or propargyl groups; or halogen such as fluorine or chlorine atoms. The starting materials may also contain one or more than one double bond.

The sulfonyloxy group in position 4 of the starting material is especially derived from a lower aliphatic or aromatic sulfonic acid, e.g. methansulfonic, ethanesulfonic, propanesulfonic, benzenesulfonic, parabromobenzenesulfonic, meta-nitrobenzenesulfonic or paratoluenesulfonic acid. Preferred 3-ketals are those derived from lower aliphatic alcohols, more especially those from lower alkanediols, such as ethanediol, 1:2- or 1:3-propanediol or 2:3-butanediol.

Preferred starting materials are those which correspond to the formulae

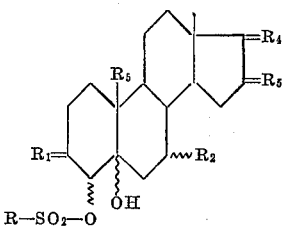

and

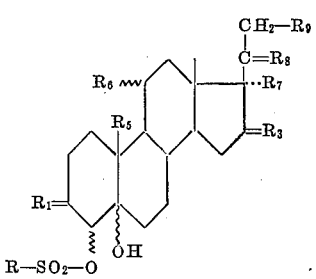

in which R stands for a lower alkyl radical or an unsubstituted phenyl radical or for a phenyl radical substituted by halogen atoms, nitro and/or lower alkyl groups; $R_1$ stands for a lower alkylenedioxy group, $R_2$ for a hydrogen atom or a lower alkyl group in position $\alpha$ or $\beta$, $R_3$ for two hydrogen atoms, or a methylene group, or a hydrogen atom together with a lower alkyl group or a free, esterified or etherified hydroxyl group each in position $\alpha$ or $\beta$, $R_4$ represents an oxo or a lower alkylenedioxy group or a free, esterified or etherified $\beta$-hydroxyl group and a hydrogen atom or a lower aliphatic hydrocarbon radical, $R_5$ stands for a hydrogen atom or a methyl group, $R_6$ for a hydrogen atom or a free or esterified hydroxyl group in position $\alpha$ or $\beta$, $R_7$ and $R_9$ each represents a hydrogen atom or an esterified or etherified hydroxyl group, $R_8$ stands for an oxo or a lower alkylenedioxy group or a hydrogen atom and a free, esterified or etherified hydroxyl group or $R_7+R_8$ and $R_8+R_9$ together represent a lower alkylenedioxy group each, there is advantageously used a base, preferably an alkali metal alcoholate, especially one derived from a tertiary alcohol, such as potassium tertiary butylate.

The reaction according to the present invention is advantageously performed in an inert organic solvent, more especially in the alcohols from which the above-mentioned alcoholates are derived, e.g. tertiary butanol, a glycol such as ethyleneglycol, an ether such as dioxane or a polyglycol ether, in a dialkylformamide or dialkylsulfoxide, such as dimethylformamide or dimethylsulfoxide, advantageously at an elevated temperature, in the presence or absence of an inert gas. Any esterified hydroxyl groups present in the starting materials may be hydrolysed in the course of the reaction according to this invention.

Surprisingly, the ketalized 3-oxo group is converted into the free 3-oxo group during the basic treatment described above; normally, such a conversion occurs only under acidic conditions.

The invention includes also any modification of the present process in which an intermediate obtained at any stage of the process is used as starting material and any remaining step or steps is or are carried out, or the process is discontinued at any stage thereof, or a starting material is formed under the reaction conditions or is used in the form of a salt or other derivative thereof.

The starting materials are new and are, therefore, also included in the present invention. They can be prepared, for example, by hydroxylating a Δ⁴-3-oxosteroid in the 4:5-position with hydrogen peroxide in the presence of osmium tetroxide, reacting the resulting dihydroxy compound with a reactive functional derivative of an organic sulfonic acid, more especially with a halide thereof, in the presence of a base, e.g. pyridine, and ketalizing the resulting 3-oxo-4-sulfonyloxy-5-hydroxysteroid in position 3 in the known manner. Alternatively, a Δ⁴-3-oxosteroid may be reacted in a reactor equipped with a water separator with a lower alcohol, especially a lower glycol such as ethyleneglycol, in a boiling hydrocarbon such as benzene or toluene, in the presence of an organic carboxylic acid, advantageously an alkanedicarboxylic acid such as oxalic or succinic or especially adipic acid, to form the Δ⁴-3-ketal which is the hydroxylated in position 4:5, for example with osmium tetroxide in an organic base, such as pyridine, treating the resulting osmium compound with hydrogen sulfide and converting the 4:5-dihydroxysteroid-3-ketal thus obtained into the 4-sulfonyloxy compound as described above.

The products of the invention are pharmacologically active compounds or valuable intermediates for their manufacture. Thus, for example, the new products of the androstane and 19-norandrostane series display an anabolic and gestgenic or ovulation inhibiting action respectively, those of the pregnane series a progestative and anti-inflammatory action, while those of the androstane, 19-norandrostane and cholestane series act against cholesterolaemia. When the final product obtained is a compound of the cholane, cholestane, spirostane or cardanolide series, it can be converted, if desired, by a known method into one of the pharmacologically highly active compounds of the androstane or pregnane series, for example by acylolysis, oxidation and/or a microbiological method.

The following examples illustrate the invention without limiting its scope in any way.

*Example 1*

A solution of 50 mg. of 3-ethylenedioxy-4-mesyloxy-5:17β-dihydroxy-androstane and 50 mg. of potassium tertiary butylate in 50 ml. of tertiary butanol is refluxed over night, then allowed to cool, 10 ml. of water are added and the whole is evaporated to dryness under vacuum. The residue is taken up in diethyl ether, the solution is washed neutral with water and evaporated. The crystalline residue (40 mg.) gives with ferric chloride a positive reaction; it is recrystallized twice from methylenechloride+hexane and yields 30 mg. of 3:6-dioxo-17β-hydroxy-A-nor-B-homoandrostane melting at 117 to 118° C. According to its mixed melting point test, ultraviolet and infrared spectra and thin-layer chromatogram (silica gel G; benzene+methanol 9:1) it is identical with the product described in Helvetica Chimica Acta 45, page 1031 (1962) for which erroneously a melting point of 136 to 138° C. was reported.

Instead of the 17-hydroxy compound the corresponding 17-acetoxy compound may be used as starting material.

The starting materials can be prepared as follows:

(a) 3.7 g. of testosterone acetone and 200 mg. of adipic acid are boiled in a mixture of 100 ml. of benzene and 25 ml. of ethyleneglycol for 46 hours with the use of a water separator. The cooled mixture is poured over ice, extracted with ether and the organic phase is washed with sodium bicarbonate solution and then copiously with water. The resulting crude product (3.97 g.) is chromatographed on neutral alumina (activity II). A 3:1-mixture of petroleum ether and benzene elutes 2.2 g. of Δ⁴-3-ethylenedioxy-17β-acetoxy-androstane which, after one recrystallization from acetone+petroleum ether, melts at 149 to 151° C. Optical rotation $[\alpha]_D = +85°$ (c.=0.85 in chloroform).

1 g. of osmium tetroxide is added to a cooled solution of 1.1 g. of Δ⁴-3-ethylenedioxy-17β-acetoxy-androstene in 6 ml. of pyridine. The solution is kept for 4 days in the dark at room temperature and for 20 minutes hydrogen sulfide is then injected into it; the precipitated osmium sulfide is filtered off and the residue rinsed copiously with pyridine. The dark-brown solution is evaporated to dryness under vacuum, the residue taken up in ethyl acetate, and the solution is purified by chromatography on neutral alumina (activity III). The resulting eluate is further purified by being treated in a methanolic solution with animal charcoal, to yield 750 mg. of amorphous 3-ethylenedioxy-4:5-dihydroxy-17β-acetoxy-androstane which is revealed by its thin-layer chromatogram (silica gel G; benzene+methanol 85.5) to be unitary. Infraerd bands $\mu_{max}$=3550, 1720 and 1250 cm.⁻¹.

The resulting diol is dissolved in 20 ml. of pyridine and the solution is mixed with 0.7 ml. of mesyl chloride. The reaction mixture is kept overnight at room temperature, then taken up in ether and while being cooled with ice washed with sodium bicarbonate solution and water. The organic phase is evaporated under vacuum and the residue dissolved in chloroform and filtered through neutral alumina (activity III). The resulting crystalline 3-ethylenedioxy-4-mesyloxy-5-hydroxy-17β-acetoxy-androstane (691 mg.) melts after one crystallization from acetone+petroleum ether at 180° C. with decomposition. Optical rotation $[\alpha]_D = +27°$ (c.=0.51 in chloroform).

(b) 50 mg. of osmium tetroxide and 2 ml. of 30% perhydrol are stirred into a solution of 1 g. of testosterone acetate in 30 ml. of ether and the batch is stirred on for 24 hours at room temperature. Another 2 ml. of perhydrol are then added and the mixture is stirred on for 4 days. The reaction mixture is then diluted with ether and the resulting phase is successively washed with potassium iodide solution, sodium thiosulfate solution and water, to yield 1.14 g. of crystalline 3-oxo-4:5-dihydroxy-17-acetoxy-androstane which, as revealed by its ultraviolet spectrum and thin-layer chromatogram is still contaminated with about 10% of starting material. The crude diol is then dissolved in 10 ml. of pyridine and 2 ml. of mesyl chloride are added to the solution. The reaction mixture is kept for 2 hours at 20° C. and then for 12 hours at −30° C., then poured over a mixture of ice and sodium bicarbonate and extracted with ether. The ethereal phase is copiously washed with water until the washings run neutral, dried and evaporated under vacuum, to yield 950 mg. of crystals which are chromatographed on 100 times their own weight of silica gel (particle size below 0.08 mm.). A 2:1-mixture of hexane-acetone first elutes 60 mg. of testosterone acetate. The following fractions furnish 702 mg. of 3-oxo-4-mesyloxy-5-hydroxy-17β-acetoxy-androstane which, after one recrystallization from acetone+petroleum ether, melts at 190 to 191° C. with decomposition. Optical rotation $[\alpha]_D = +25°$ (c.=0.69 in chloroform).

A solution of 50 mg. of the resulting mesylate in a mixture of 50 ml. of benzene and 20 ml. of ethyleneglycol is heated in the presence of 50 mg. of para-toluenesulfonic acid for 5 hours with the use of a water separator. The batch is then poured over a mixture of ice and sodium bicarbonate, extracted with ether, and the extract is copiously washed with water until the washings run neutral. The dried ether solution is evaporated and yields 60 mg. of partially crystalline product which is dissolved in methylene chloride and filtered through neutral alumina (activity III), yielding 40 mg. of 3-ethylenedioxy-4-mesyloxy-5-hydroxy-17β-acetoxy-androstane; after having been twice recrystallized from acetone+petroleum ether it melts at 180° C. with decomposition. It is identical with the final product described under (a) above.

The corresponding 17-hydroxy compound can be prepared from it, for example, by hydrolysis with methanolic potassium carbonate solution.

When 17α-methyltestosterone acetate is used instead of testosterone acetate, proceeding otherwise in identical manner, 3:6 - dioxo - 17α - methyl - 17β-hydroxy-A-nor-B- homoandrostane melting at 168 to 170° C. is obtained. Optical rotation $[\alpha]_D = +34°$ (c.=0.92 in chloroform).

*Example 2*

The following products can be manufactured by the methods described in Example 1:

| Starting material | Final product |
|---|---|
| (1) 3-Ethylenedioxy-4-mesyloxy-5-hydroxy-20-acetoxy-pregnane. | (1) 3:6-dioxo-20-hydroxy-A-nor-B-homopregnane, M.P. 117-118° C. |
| (2) 3-Ethylenedioxy-4-tosyloxy-5-hydroxy-cholestane. | (2) 3:6-Dioxo-A-nor-B-homocholestane, M.P. 99° C. |
| (3) 3-Ethylenedioxy-4-mesyloxy-5:17β-dihydroxy-7α:17α-dimethyl-estrane. | (3) 3:6-Dioxo-7α:17α-dimethyl-17β-hydroxy-A-nor-B-homostrane, M.P. 168-169° C. |
| (4) 3-Ethylenedioxy-4-mesyloxy-5:17β-dihydroxy-7α:17α-dimethyl-androstane. | (4) 3:6-dioxo-7α:17α-dimethyl-17β-hydroxy-A-nor-B-homoandrostane, M.P. 162-163° C. |
| (5) 3-Ethylenedioxy-4-tosyloxy-5:17β-dihydroxy-17α-ethinyl-estrane. | (5) 3:6-Dioxo-17α-ethinyl-17β-hydroxy-A-nor-B-homoestrane, M.P. 156-158° C. |
| (6) 3-Ethylenedioxy-4-tosyloxy-5:17β-dihydroxy-17α-ethinyl-androstane. | (6) 3:6-Dioxo-17α-ethinyl-17β-hydroxy-A-nor-B-homoandrostane, M.P. 166-168° C. |
| (7) 17:20; 20:21-bismethylenedioxy derivative of 3-ethylenedioxy-4-tosyloxy-5:11β:17α:21-tetrahydroxy-20-oxo-pregnane. | (7) 17:20; 20:21-bismethylenedioxy derivative of 3:6:20-trioxo-11β:17α:21-trihydroxy-A-nor-B-homopregnane, melting at 192-194° C. The free compound, obtained from it by acidic hydrolysis, melts at 142-144° C. |

The starting materials can be prepared, for example, as follows:

100 mg. of osmium tetroxide and 6 ml. of 30% perhydrol are stirred into a solution of 3 g. of testosterone acetate in 100 ml. of ether, and the batch is stirred on for 24 hours at room temperature. Another 6 ml. of perhydrol and 100 mg. of osmium tetroxide are then added and the mixture is stirred on for 6 days at room temperature, then diluted with ether and successively washed with potassium iodide solution, sodium thiosulfate solution and water. The resulting 3-oxo-4:5-dihydroxy-17β-acetoxy-androstane (3.39 g.) is dissolved in ether, filtered through silica gel and the benzene solution is then decolorized with animal charcoal. The resulting crystals (3.105 g.) are recrystallized once from acetone+petroleum ether and then melt at 169° C. Optical rotation $[\alpha]_D = +27°$ (c.=0.64 in chloroform). Infrared absorption bands at 3580, 3450, 1725-1705 and 1250 cm.$^{-1}$.

A solution of 1.14 g. of the resulting diol in 10 ml. of pyridine is mixed with 2 ml. of mesyl chloride. After keeping the solution for 2½ hours at room temperature it is poured over a mixture of ice and sodium bicarbonate and extracted with ether. The extract is copiously washed with water until the washings run neutral, dried and then evaporated, to yield 1.27 g. of crystalline 3-oxo-4-mesyloxy-5-hydroxy-17β-acetoxy-androstane which is dissolved in ether and filtered through neutral silica gel. One recrystallization of the residue of the eluate from acetone+petroleum ether yields 1.12 g. of pure substance melting at 190° C. Optical rotation $[\alpha]_D = +25°$ (c.=0.69 in chloroform). Infrared absorption bands at 3580, 1740-1715, 1366 and 1260 cm.$^{-1}$.

The resulting mesylate is ketalized as described in Example 1.

What is claimed is:

1. Process for the manufacture of 3:6-dioxo-A-nor-B-homo-steroids, wherein a 4-sulfonyloxy-5-hydroxy-steroid-3-ketal in which the 4:5-substituents are in cis-position relatively to each other and which contain in 11-position a member selected from the group consisting of hydrogen, hydroxy and acyloxy derived from a carboxylic acid having up to 20 carbon atoms, are treated with an alkali metal alcoholate.

2. Process as claimed in claim 1, wherein the alkali metal compound of a tertiary alcohol is used.

3. Process as claimed in claim 2, wherein potassium tertiary butylate is used.

4. Process as claimed in claim 1, wherein the reaction is carried out in an organic solvent.

5. Process as claimed in claim 4, wherein a member selected from the group consisting of an alcohol, an ether, a di-lower alkylformamide and di-lower alkyl-sulfoxide is used.

6. Process as claimed in claim 1, wherein a 4-sulfonyloxy-5-hydroxysteroid-3-ketal selected from the androstane, pregnane, cholane, cholestane spirostane, cardanolide and the corresponding 19-nor-series is used as starting material in which steroid the sulfonyloxy group is derived from a member selected from the group consisting of a lower aliphatic and a monocyclic aromatic sulfonic acid and the ketal grouping is that of a lower aliphatic alcohol.

7. Compounds of the formula in which R stands for a member selected from the group consisting of lower alkyl and phenyl of the formula in which each of the letters X, Y, and Z represents a member selected from the group consisting of hydrogen, halogen, nitro and lower alkyl, $R_1$ for lower alkylenedioxy, $R_2$ for a member selected from the group consisting of hydrogen, α-lower alkyl and β-lower alkyl, $R_3$ for a member selected from the group consisting of methylene, wherein M represents a member selected from the group consisting of hydrogen, hydroxy, acyloxy, lower alkoxy and 2-tetrahydropyranyloxy, $R_4$ for a member selected from the group consisting of oxo, lower alkylene-dioxy and wherein N represents a member selected from the group consisting of hydroxy, acyloxy, lower alkoxy and 2-tetrahydropyranyloxy and P represents a member selected from the group consisting of hydrogen, lower alkyl, lower alkenyl and lower alkynyl and $R_5$ for a member selected from the group consisting of hydrogen and methyl each of said acyloxy groups being derived from a carboxylic acid having 1 to 20 carbon atoms.

8. 3-ethylenedioxy-4-mesyloxy-5:17β-dihydroxy-androstane.

9. The 17-acetate of the compound claimed in claim 8.

10. 3-ethylenedioxy-4-mesyloxy - 5:17β-dihydroxy-17α-methyl-androstane.

11. The 17-acetate of the compound claimed in claim 10.

12. 3-ethylenedioxy-4-mesyloxy-5-hydroxy-20-acetoxy-pregnane.

13. 3-ethylenedioxy-4-tosyloxy-5-hydroxy-cholestane.

14. 3-ethylenedioxy-4-mesyloxy - 5:17β-dihydroxy-7α:17α-dimethyl-estrane.

15. 3-ethylenedioxy-4-mesyloxy - 5:17β-dihydroxy-7α:17α-dimethyl-androstane.

16. 3-ethylenedioxy-4-tosyloxy - 5:17β-dihydroxy-17α-ethinyl-estrane.

17. 3-ethylenedioxy-4-tosyloxy - 5,17β-dihydroxy-17α-ethinyl-androstane.

18. 17:20, 20:21-bismethylenedioxy derivative of 3-ethylenedioxy-4-tosyloxy - 5:11β:17α:21 - tetrahydroxy-20-oxo-pregnane.

19. A compound of the formula

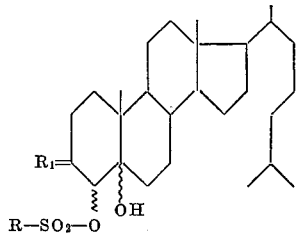

in which R stands for a member selected from the group consisting of lower alkyl, phenyl and phenyl substituted by halogen atoms, phenyl substituted by nitro groups and phenyl substituted by lower alkyl groups, and $R_1$ stands for a lower alkylenedioxy group.

20. A member selected from the group consisting of compounds of the formula

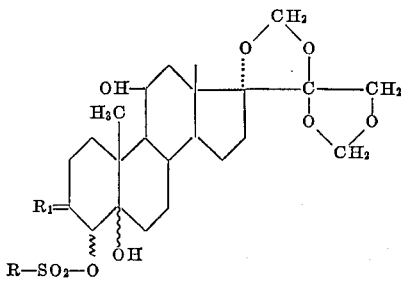

in which R stands for a member selected from the group consisting of lower alkyl, phenyl and phenyl substituted by halogen atoms, phenyl substituted by nitro groups and phenyl substituted by lower alkyl groups, $R_1$ stands for a lower alkylenedioxy group.

No references cited.

LEWIS GOTTS, *Primary Examiner.*
ELBERT L. ROBERTS, *Examiner.*